(12) United States Patent
Zhao et al.

(10) Patent No.: US 10,956,700 B2
(45) Date of Patent: Mar. 23, 2021

(54) DISPLAY DEVICE

(71) Applicants: Beijing BOE Display Technology Co., Ltd., Beijing (CN); BOE Technology Group Co., Ltd., Beijing (CN)

(72) Inventors: Ying Zhao, Beijing (CN); Shipei Li, Beijing (CN); Qingping Yin, Beijing (CN); Tao Li, Beijing (CN); Huili Wu, Beijing (CN); Chunming Cui, Beijing (CN); Zihao Zhao, Beijing (CN); Jie Jin, Beijing (CN); Weimeng Zhang, Beijing (CN)

(73) Assignees: Beijing BOE Display Tchnology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 16/519,045

(22) Filed: Jul. 23, 2019

(65) Prior Publication Data
US 2020/0210672 A1      Jul. 2, 2020

(30) Foreign Application Priority Data

Jan. 2, 2019 (CN) .......................... 201910002465.3

(51) Int. Cl.
*G06K 9/00* (2006.01)
*H01L 51/56* (2006.01)
(Continued)

(52) U.S. Cl.
CPC ....... *G06K 9/00006* (2013.01); *G06K 9/2018* (2013.01); *H01L 51/56* (2013.01); *G06F 21/32* (2013.01)

(58) Field of Classification Search
CPC .................... G02B 27/0101; G02B 2006/0098
(Continued)

(56) References Cited

U.S. PATENT DOCUMENTS

| 2002/0167725 A1* | 11/2002 | Goto | ..................... G03B 21/625 |
| | | | 359/456 |
| 2013/0155353 A1* | 6/2013 | Ma | ..................... G02F 1/136209 |
| | | | 349/106 |

(Continued)

FOREIGN PATENT DOCUMENTS

| CN | 102645691 A | 8/2012 |
| CN | 104409659 A | 3/2015 |
| CN | 107092892 A | 8/2017 |

OTHER PUBLICATIONS

Office Action dated Jun. 3, 2020 for corresponding Chinese Application No. 201910002465.3.

*Primary Examiner* — William J Carter
(74) *Attorney, Agent, or Firm* — Arent Fox LLP; Michael Fainberg

(57) ABSTRACT

The disclosure relates to a display device including: an organic light-emitting diode display panel, a fingerprint recognition layer located below the organic light-emitting diode display panel, and a light filtering layer located between the organic light-emitting diode display panel and the fingerprint recognition layer, where the light filtering layer is configured to filter out light rays with an incidence angle greater than a filter angle among light rays carrying fingerprint line information, and to transmit light rays with an incidence angle smaller than or equal to the filter angle, where the incidence angle is the angle between the light rays carrying fingerprint line information, and the direction perpendicular to the fingerprint recognition layer.

14 Claims, 3 Drawing Sheets

(51) Int. Cl.
*G06K 9/20* (2006.01)
*G06F 21/32* (2013.01)

(58) Field of Classification Search
USPC .............................. 362/600–634, 97.1–97.4
See application file for complete search history.

(56) References Cited

U.S. PATENT DOCUMENTS

2015/0205992 A1\* 7/2015 Rowe .................... G06K 9/2018
                                                   382/124
2018/0068157 A1\* 3/2018 Zeng ...................... G06K 9/001

\* cited by examiner

DISPLAY DEVICE

CROSS-REFERENCE TO RELATED APPLICATION

This application claims priority of Chinese Patent Application No. 201910002465.3, filed on Jan. 2, 2019, which is hereby incorporated by reference in its entirety.

FIELD

The present disclosure relates to the field of display technologies, and particularly to a display device.

BACKGROUND

As smart mobile phones are gradually popular, display devices with a high screen occupancy ratio have been increasingly favored. A fingerprint recognition function can be built in a display panel to thereby dispense with a space occupied by a fingerprint recognition module on the front face of a mobile phone so as to greatly improve a screen occupancy ratio thereof. The majority of the existing fingerprint recognition applications below the display panel are generally designed for an OLED display panel because the OLED display panel supports self-emission display, where light emitted by the display panel can be reflected by a finger, and passed to a fingerprint recognition (sensor) layer below the OLED display panel, and the sensor layer reads fingerprint line information formed as a result of optical reflection, and recognizes a fingerprint.

SUMMARY

A display device according to some embodiments of the disclosure includes: an organic light-emitting diode display panel, a fingerprint recognition layer located below the organic light-emitting diode display panel, and a light filtering layer located between the organic light-emitting diode display panel and the fingerprint recognition layer, wherein:
the light filtering layer is configured to filter out light rays with an incidence angle greater than a filter angle among light rays carrying fingerprint line information, and to transmit light rays with an incidence angle smaller than or equal to the filter angle, wherein the filter angle is an angle between the light rays carrying fingerprint line information and a direction perpendicular to the fingerprint recognition layer.

In a possible implementation, in the display device above according to some embodiments of the disclosure, the light filtering layer includes a plurality of filtering structures arranged in an array, a shape of a section of the plurality of filtering structures in a direction from the fingerprint recognition layer to the organic light-emitting diode display panel is an inverted trapezium, surfaces on left and right sides of the inverted trapezium facing the plurality of filtering structures are reflecting faces, and an angle complementary to an angle between each of the reflecting faces and the direction perpendicular to the fingerprint recognition layer is a sharp angle.

In a possible implementation, in the display device above according to some embodiments of the disclosure, the light filtering layer includes a plurality of filtering structures arranged in an array;
a shape of a section of a gap between two adjacent filtering structures in a direction from the fingerprint recognition layer to the organic light-emitting diode display panel is an inverted trapezium; and
a shape of a section of the plurality of the filtering structure in the direction from the fingerprint recognition layer to the organic light-emitting diode display panel is a triangle, and surfaces on left and right sides of the triangle facing the plurality of the filtering structures are reflecting faces with a sharp angle from the direction perpendicular to the fingerprint recognition layer.

In a possible implementation, in the display device above according to some embodiments of the disclosure, the filter angle is determined according to a height of the inverted trapezium, a width of the bottom side of the inverted trapezium proximate to the organic light-emitting diode display panel, and the sharp angle.

In a possible implementation, in the display device above according to some embodiments of the disclosure, given the width of the bottom side of the inverted trapezium proximate to the organic light-emitting diode display panel, and the sharp angle, the filter angle is inversely proportionate to the height of the inverted trapezium.

In a possible implementation, in the display device above according to some embodiments of the disclosure, given the height of the inverted trapezium, and the width of the bottom side of the inverted trapezium proximate to the organic light-emitting diode display panel, the filter angle is inversely proportionate to the sharp angle.

In a possible implementation, in the display device above according to some embodiments of the disclosure, given the height of the inverted trapezium, and the sharp angle, the filter angle is proportionate to the width of the bottom side of the inverted trapezium proximate to the organic light-emitting diode display panel.

In a possible implementation, in the display device above according to some embodiments of the disclosure, the reflecting faces are mirrors.

In a possible implementation, in the display device above according to some embodiments of the disclosure, the display device further includes a light transmitting layer located between the organic light-emitting diode display panel and the light filtering layer; and
the light transmitting layer and the light filtering layer are structured integrally.

In a possible implementation, in the display device above according to some embodiments of the disclosure, the light filtering layer and the fingerprint recognition layer are structured integrally.

DETAILED DESCRIPTION OF THE EMBODIMENTS

Figure 1:
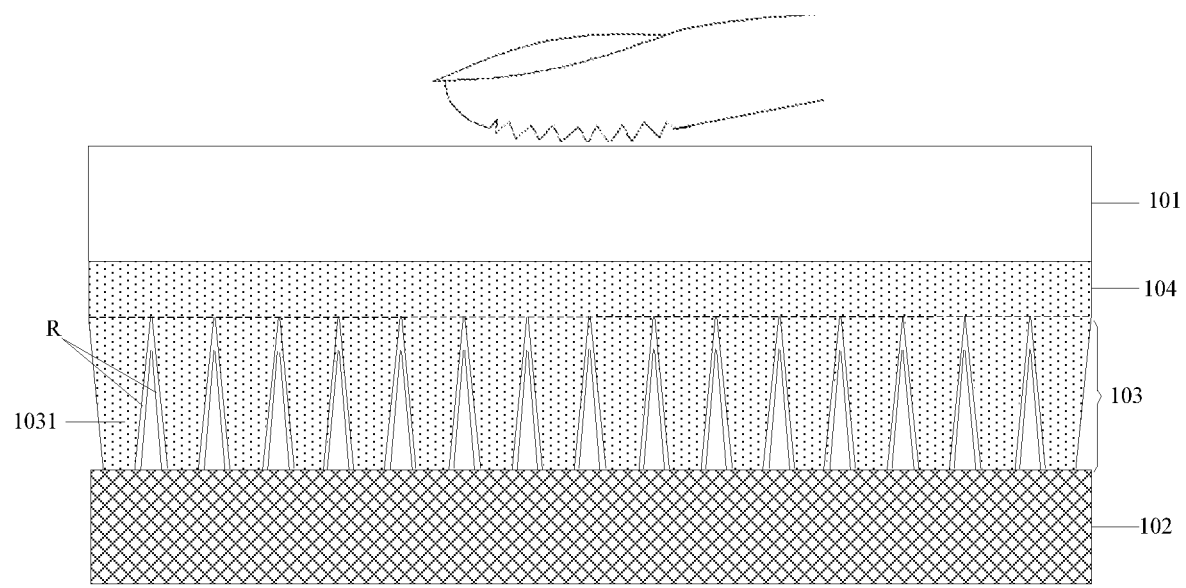
FIG. 1 is a schematic structural diagram of a display device according to some embodiments of the disclosure.

Particular implementations of the display device according to some embodiments of the disclosure will be described below in details with reference to the drawings. It shall be noted that some embodiments described in this specification are only a part but not all of some embodiments of the disclosure, and some embodiments of the disclosure, and the features in some embodiments can be combined with each other unless they conflict with each other. Moreover based upon some embodiments here of the disclosure, all the other embodiments which can occur to those ordinarily skilled in the art without any inventive effort shall fall into the claimed scope of the disclosure.

The shapes and sizes of respective layers in the drawings are not intended to reflect any real proportion of the display device, but only intended to illustrate the disclosure.

Figure 2:
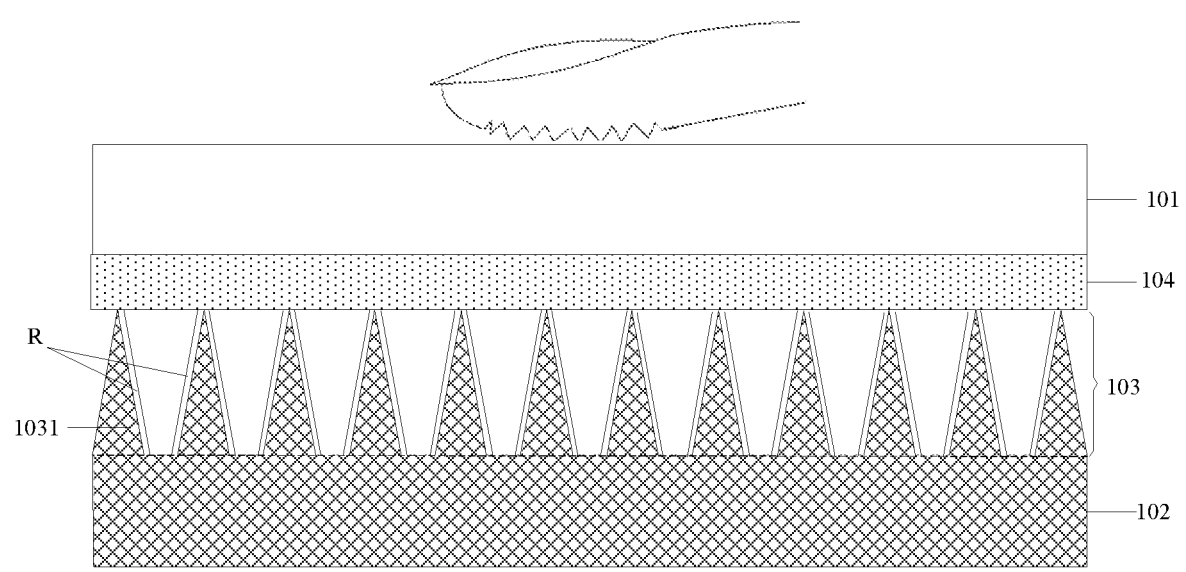
FIG. 2 is a schematic structural diagram of another display device according to some embodiments of the disclosure.

In the related art, the precision of fingerprint recognition may be degraded by light rays with a large angle from the direction perpendicular to a fingerprint recognition layer among light rays carrying fingerprint line information, so some embodiments of the disclosure provide a display device as illustrated in FIG. 1 and FIG. 2, where the display device includes: an organic light-emitting diode display panel 101, a fingerprint recognition layer 102 located below the organic light-emitting diode display panel 101, and a light filtering layer 103 located between the organic light-emitting diode display panel 101 and the fingerprint recognition layer 102.

Figure 3:
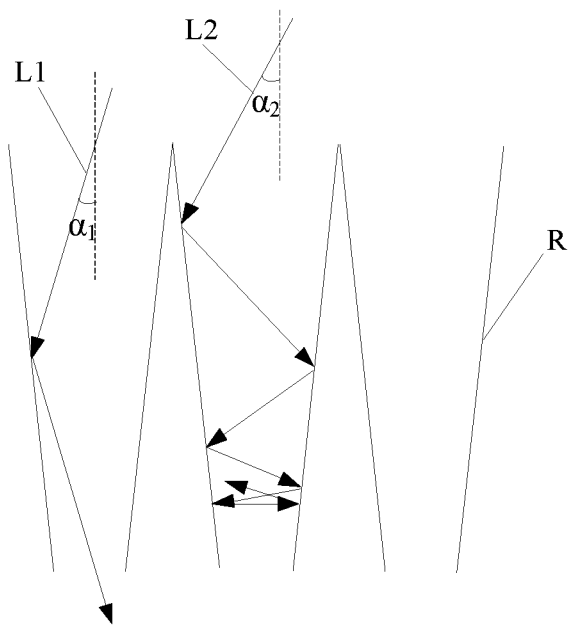
FIG. 3 is a schematic principle diagram of improving the precision of fingerprint recognition in a display device according to some embodiments of the disclosure.

The light filtering layer 103 is configured to filter out light rays with an incidence angle greater than a filter angle (e.g., light rays L2 as illustrated in FIG. 3) among light rays carrying fingerprint line information, and to transmit light rays with an incidence angle smaller than or equal to the filter angle (e.g., light rays L1 as illustrated in FIG. 3), where the filter angle is the largest angle without degrading the desirable precision of fingerprint recognition, between light rays L carrying fingerprint line information and the direction perpendicular to the fingerprint recognition layer 102 in a real application, and the material of the light filtering layer 103 is a transparent material through which light can be transmitted.

Figure 4:
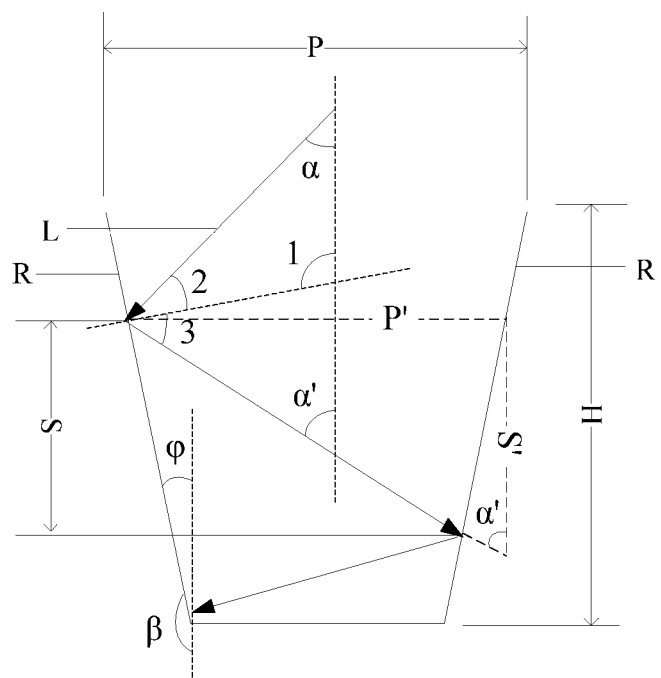
FIG. 4 is a schematic principle diagram of improving the precision of fingerprint recognition in a display device according to another embodiment of the disclosure.
Figure 5:
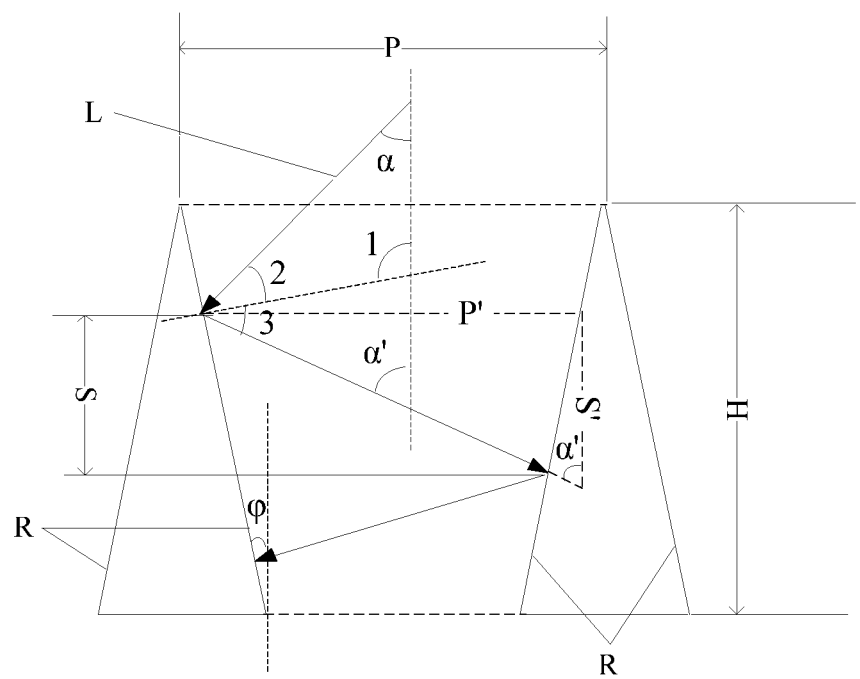
FIG. 5 is a schematic principle diagram of improving the precision of fingerprint recognition in a display device according to a further embodiment of the disclosure.

The incidence angle $\alpha$ is the angle between the light rays L carrying fingerprint line information, and the direction perpendicular to the fingerprint recognition layer 102 as illustrated in FIG. 4 and FIG. 5.

In the display device above according to some embodiments of the disclosure, the light filtering layer 103 can filter out the light rays with an incidence angle $\alpha$ greater than the filter angle among the light rays carrying fingerprint line information, and to transmit the light rays with an incidence angle $\alpha$ smaller than or equal to the filter angle, so the light rays with an incidence angle greater than the filter angle can be filtered out to thereby avoid fingerprint recognition from being affected by the light rays with an incidence angle greater than the filter angle, thus improving the precision of fingerprint recognition.

In a particular implementation, in the display device above according to some embodiments of the disclosure, there may be the following two implementations of the light filtering layer 103.

In a first implementation, as illustrated in FIG. 1, the light filtering layer 103 can include a plurality of filtering structures 1031 arranged in an array, where the shape of the section of each filtering structure 1031 in the direction from the fingerprint recognition layer 102 to the organic light-emitting diode display panel 101 is an inverted trapezium, that is, the length of the bottom side of the filtering structure proximate to the organic light-emitting diode display panel 101 is greater than the length of the bottom side thereof proximate to the fingerprint recognition layer 102, the surfaces on the left and right sides of the inverted trapezium facing the filtering structures 1031 are reflecting faces R, and an angle complementary to the angle $\beta$ between each reflecting face R, and the direction perpendicular to the fingerprint recognition layer 102 is a sharp angle $\varphi$. The reflecting faces R can be made of metal or another reflecting material.

In a second implementation, as illustrated in FIG. 2, the light filtering layer 103 includes a plurality of filtering structures 1031 arranged in an array.

The shape of the section of a gap between two adjacent filtering structures 1031 in the direction from the fingerprint recognition layer 102 to the organic light-emitting diode display panel 101 is an inverted trapezium, that is, the length of the bottom side of gap proximate to the organic light-emitting diode display panel 101 is greater than the length of the bottom side thereof proximate to the fingerprint recognition layer 102.

The shape of the section of each filtering structure 1031 in the direction from the fingerprint recognition layer 102 to the organic light-emitting diode display panel 101 is a triangle, and the surfaces on the left and right sides of the triangle facing the filtering structures 1031 are reflecting faces R with a sharp angle $\varphi$ from the direction perpendicular to the fingerprint recognition layer 102.

Optionally, as illustrated in FIG. 3, the light rays L1 within the filter angle range are incident on the fingerprint recognition layer 102 by being reflected on the reflecting faces R for several times, and even incident on the fingerprint recognition layer 102 directly through between two reflecting faces R, and the light rays L2 out of the filter angle range are reflected repeatedly on the reflecting faces R, and then reflected back to the organic light-emitting diode display panel 101, so that the light rays at a large angle can be filtered out to thereby avoid a signal crosstalk so as to improve the precision of fingerprint recognition.

In a particular implementation, in the display device above according to some embodiments of the disclosure, as illustrated in FIG. 4 and FIG. 5, the filter angle is determined according to the height H of the inverted trapezium, the width of the bottom side P of the inverted trapezium proximate to the organic light-emitting diode display panel 101, and the sharp angle $\varphi$.

Optionally, as can be apparent from FIG. 4 and FIG. 5, $\square 1=90°+\varphi$, $\square 2=\square 3=180°-\square 1-\alpha=90°-\varphi-\alpha$, and $\square \alpha'=\square 1-\square 3=\alpha+2\varphi$, that is, the angle $\alpha'$ between the light rays L and the normal is increased by $2\varphi$ relative to the incidence angle $\alpha$ each time the light rays L are reflected. As can be apparent, the distance S over which the light rays L are propagated downward each time they are reflected, is proportionate to a related parameter S' of reflection position, and the related parameter S' of reflection position satisfies $S'=P'*\cot(\alpha+2\varphi)$, where P' is the width of the inverted trapezium at the reflection position. As can be apparent, given P', if the angle $\alpha'$ between the light rays L and the normal is larger, then the related parameter S' of reflection position will be smaller, and the distance S over which the light rays L are propagated downward each time they are reflected will be shorter.

However, only if the total distance S over which the light rays L are propagated downward is greater than the height H of the inverted trapezium, then the light rays L will be incident on the fingerprint recognition layer 102, so given the width of the bottom side P of the inverted trapezium proximate to the organic light-emitting diode display panel 101, and the sharp angle φ, if the height H of the inverted trapezium is larger, then the total distance S over which the light rays L with a larger angle α' from the normal are propagated downward will be less likely to be greater than the height H of the inverted trapezium, and the total distance S over which the light rays L with a smaller angle α' from the normal are propagated downward will be more likely to be greater than the height H of the inverted trapezium, so given the width of the bottom side P of the inverted trapezium proximate to the organic light-emitting diode display panel 101, and the sharp angle φ, the incidence angle α of the light rays L which can be transmitted through the light filtering layer 103 is inversely proportionate to the height H of the inverted trapezium. Since the incidence angle α of the light rays L transmitted through the light filtering layer 103 is smaller than or equal to the filter angle, given the width of the bottom side P of the inverted trapezium proximate to the organic light-emitting diode display panel 101, and the sharp angle φ, the filter angle is inversely proportionate to the height H of the inverted trapezium.

Moreover as can be apparent from the description above, the angle α' between the light rays L and the normal is increased by 2φ relative to the incidence angle α each time they are reflected, and the distance S over which the light rays L are propagated downward each time they are reflected is proportionate to the related parameter S' of reflection position, where the related parameter S' of reflection position is S'=P'*cot(α+2φ), and P' is the width of the inverted trapezium at the reflection position. Thus given P', for example, with P'=P, the distance S over which the light rays L are propagated downward each time they are reflected is only dependent upon the incidence angle α and the sharp angle φ, and if there is a larger distance S over which the light rays L are propagated downward each time so that the total distance S over which the light rays L are propagated downward is greater than the height H of the inverted trapezium, then the sum of α and 2φ will be smaller. Accordingly given the height H of the inverted trapezium, and the width of the bottom side P of the inverted trapezium proximate to the organic light-emitting diode display panel 101, the incidence angle α of the light rays L which can be transmitted through the light filtering layer 103 is inversely proportionate to the sharp angle φ. Since the incidence angle α of the light rays L transmitted through the light filtering layer 103 is smaller than or equal to the filter angle, given the height H of the inverted trapezium, and the width of the bottom side P of the inverted trapezium proximate to the organic light-emitting diode display panel 101, the filter angle is inversely proportionate to the sharp angle φ.

Furthermore as apparent from the description above, the distance S over which the light rays L are propagated downward each time they are reflected is proportionate to the related parameter S' of reflection position, and the related parameter S' of reflection position is S'=P'*cot(α+2φ), where P' is the width of the inverted trapezium at the reflection position. Furthermore as can be appreciated, given the height H of the inverted trapezium, and the sharp angle φ, if the bottom side P of the inverted trapezium proximate to the organic light-emitting diode display panel 101 is wider, then the width P' of the inverted trapezium at the same reflection position will be larger, so that the related parameter S' of reflection position will be larger, and the distance S over which the light rays L are propagated downward each time they are reflected will be larger, so the total distance S over which the light rays L are propagated downward will be more likely to be larger than the height H of the inverted trapezium, and thus incident on the fingerprint recognition layer 102, and consequently the light rays L with the incidence angle α in a larger angle range can be adjusted onto the fingerprint recognition layer 102. Accordingly given the height H of the inverted trapezium, and the sharp angle φ, the incidence angle α of the light rays L which can be transmitted through the light filtering layer 103 is proportionate to the width of the bottom side P of the inverted trapezium proximate to the organic light-emitting diode display panel 101. Since the incidence angle α of the light rays L transmitted through the light filtering layer 103 is smaller than or equal to the filter angle, given the height H of the inverted trapezium, and the sharp angle φ, the filter angle is proportionate to o the width of the bottom side P of the inverted trapezium proximate to the organic light-emitting diode display panel 101.

In a particular implementation, in the display device above according to some embodiments of the disclosure, the reflecting faces R are mirrors, so the light rays L incident on the reflecting faces R can be reflected on the mirrors, and propagated along a path complying the reflection law, so that the propagation path of the light rays L can be controlled conveniently. In a real application, the mirrors can be formed through vapor plating or otherwise, In a particular implementation, in the display device above according to some embodiments of the disclosure, as illustrated in FIG. 1, the display device generally can further include a light transmitting layer 104 located between the organic light-emitting diode display panel 101 and the light filtering layer 103.

In order to make the display device lightweight and thin, the light transmitting layer 104 and the light filtering layer 103 can be structured integral, so the light filtering layer 103 will not be arranged separately.

In a particular implementation, in the display device above according to some embodiments of the disclosure, in order to make the display device lightweight and thin, the light filtering layer 103 can alternatively be structured integral to the fingerprint recognition layer 102 as illustrated in FIG. 2.

The display device above according to some embodiments of the disclosure includes: an organic light-emitting diode display panel, a fingerprint recognition layer located below the organic light-emitting diode display panel, and a light filtering layer located between the organic light-emitting diode display panel and the fingerprint recognition layer, where the light filtering layer is configured to filter out light rays with an incidence angle greater than a filter angle among light rays carrying fingerprint line information, and to transmit light rays with an incidence angle smaller than or equal to the filter angle, where the incidence angle is the angle between the light rays carrying fingerprint line information, and the direction perpendicular to the fingerprint recognition layer. The light filtering layer can filter out the light rays with an incidence angle greater than the filter angle among the light rays carrying fingerprint line information, and to transmit the light rays with an incidence angle smaller than or equal to the filter angle, so the light rays with an incidence angle greater than the filter angle can be filtered out to thereby avoid fingerprint recognition from being affected by the light rays with an incidence angle greater than the filter angle, thus improving the precision of fingerprint recognition.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display device, comprising: an organic light-emitting diode display panel, a fingerprint recognition layer located below the organic light-emitting diode display panel, and a light filtering layer located between the organic light-emitting diode display panel and the fingerprint recognition layer, wherein:

the light filtering layer is configured to filter out light rays with an incidence angle greater than a filter angle among light rays carrying fingerprint line information, and to transmit light rays with an incidence angle smaller than or equal to the filter angle, wherein the filter angle is an angle between the light rays carrying fingerprint line information and a direction perpendicular to the fingerprint recognition layer; and the light filtering layer comprises a plurality of filtering structures arranged in an array, a shape of a section of the plurality of filtering structures in a direction from the fingerprint recognition layer to the organic light-emitting diode display panel is an inverted trapezium, surfaces on left and right sides of the inverted trapezium facing the plurality of filtering structures are reflecting faces, and an angle complementary to an angle between each of the reflecting faces and the direction perpendicular to the fingerprint recognition layer is a sharp angle.

2. The display device according to claim 1, wherein the light filtering layer comprises a plurality of filtering structures arranged in an array;

a shape of a section of a gap between two adjacent filtering structures in a direction from the fingerprint recognition layer to the organic light-emitting diode display panel is an inverted trapezium; and a shape of a section of the plurality of filtering structures in the direction from the fingerprint recognition layer to the organic light-emitting diode display panel is a triangle, and surfaces on left and right sides of the triangle facing the plurality of filtering structures are reflecting faces with a sharp angle from the direction perpendicular to the fingerprint recognition layer.

3. The display device according to claim 2, wherein the filter angle is determined according to a height of the inverted trapezium, a width of a bottom side of the inverted trapezium proximate to the organic light-emitting diode display panel, and the sharp angle.

4. The display device according to claim 3, wherein given the width of the bottom side of the inverted trapezium proximate to the organic light-emitting diode display panel, and the sharp angle, the filter angle is inversely proportionate to the height of the inverted trapezium.

5. The display device according to claim 3, wherein given the height of the inverted trapezium, and the width of the bottom side of the inverted trapezium proximate to the organic light-emitting diode display panel, the filter angle is inversely proportionate to the sharp angle.

6. The display device according to claim 3, wherein given the height of the inverted trapezium, and the sharp angle, the filter angle is proportionate to the width of the bottom side of the inverted trapezium proximate to the organic light-emitting diode display panel.

7. The display device according to claim 2, wherein the reflecting faces are mirrors.

8. The display device according to claim 2, wherein the light filtering layer and the fingerprint recognition layer are structured integrally.

9. The display device according to claim 1, wherein the filter angle is determined according to a height of the inverted trapezium, a width of a bottom side of the inverted trapezium proximate to the organic light-emitting diode display panel, and the sharp angle.

10. The display device according to claim 9, wherein given the width of the bottom side of the inverted trapezium proximate to the organic light-emitting diode display panel, and the sharp angle, the filter angle is inversely proportionate to the height of the inverted trapezium.

11. The display device according to claim 9, wherein given the height of the inverted trapezium, and the width of the bottom side of the inverted trapezium proximate to the organic light-emitting diode display panel, the filter angle is inversely proportionate to the sharp angle.

12. The display device according to claim 9, wherein given the height of the inverted trapezium, and the sharp angle, the filter angle is proportionate to the width of the bottom side of the inverted trapezium proximate to the organic light-emitting diode display panel.

13. The display device according to claim 1, wherein the reflecting faces are mirrors.

14. The display device according to claim 1, further comprises a light transmitting layer located between the organic light-emitting diode display panel and the light filtering layer; and the light transmitting layer and the light filtering layer are structured integrally.

* * * * *